Dec. 31, 1935.  L. A. LAURSEN  2,025,992
METHOD AND APPARATUS FOR VULCANIZING TIRE CASINGS
Filed April 9, 1932
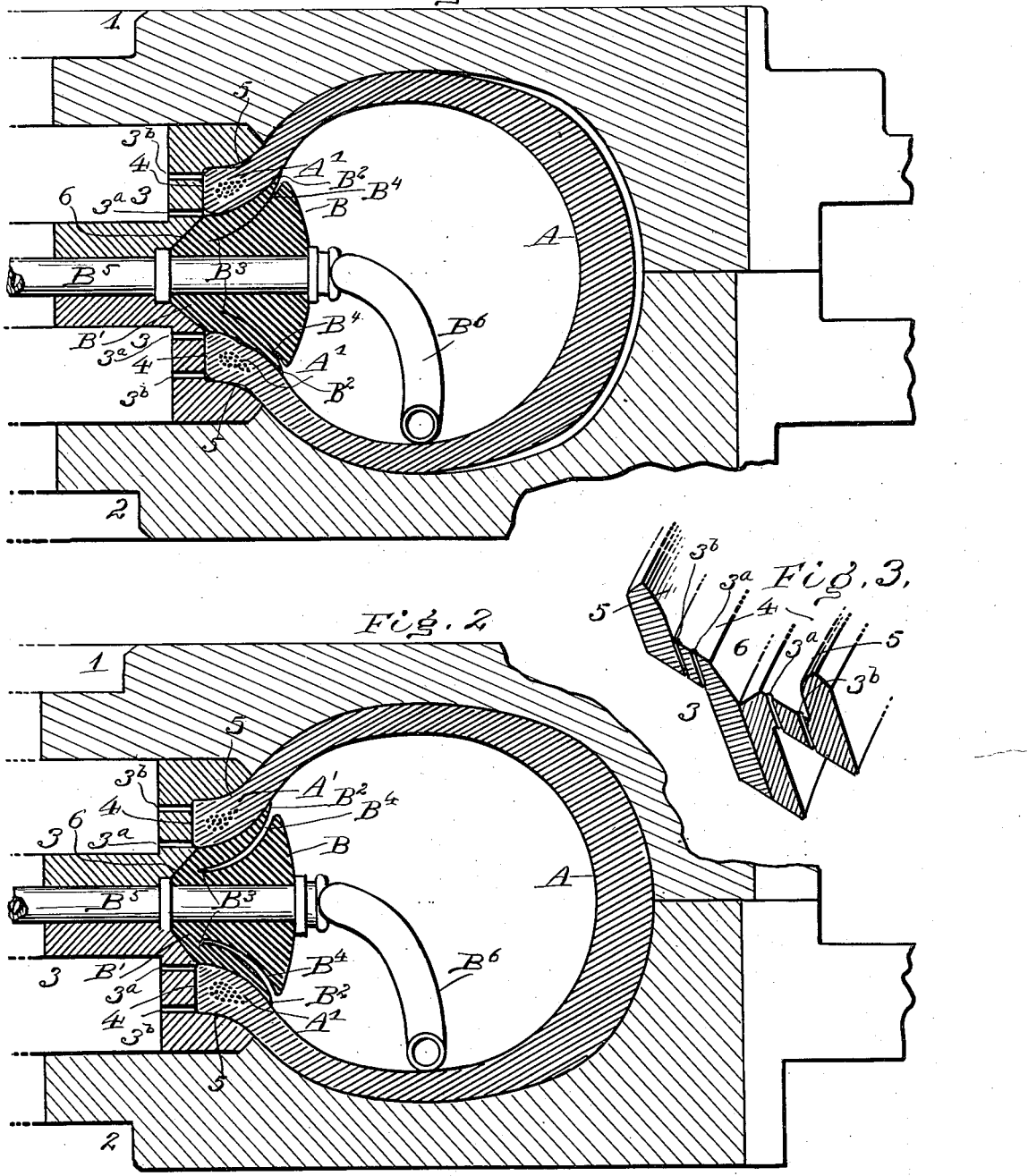
INVENTOR.
L. A. Laursen
BY
ATTORNEYS Patented Dec. 31, 1935

2,025,992

UNITED STATES PATENT OFFICE 2,025,992

METHOD AND APPARATUS FOR VULCANIZING TIRE CASINGS

Laurits A. Laursen, Akron, Ohio

Application April 9, 1932, Serial No. 604,159

19 Claims. (Cl. 18—42)

This invention relates to the vulcanization of tire casings under the action of direct internal fluid pressure, and contemplates an improved form of vulcanizing mold, as well as an improved form of sealing ring, to be used in connection with the mold.

In vulcanizing a tire casing by direct internal fluid pressure, a sealing ring in the form of a solid or relatively rigid annulus (of metal, rubber, or rubberized fabric) is first inserted within the casing, and the casing with the contained ring then placed in a sectional mold; thereafter, with the mold closed and the casing sealed at the beads, the pressure fluid (usually heated) is admitted into the sealed casing to expand the same against the walls of the mold, and the mold is heated (by a steam jacket if of the individual vulcanizer variety, or by placing it within a pot heater if not steam jacketed) for the requisite time to effect vulcanization. In some instances, the tire casing is mounted on bead rings before being placed in the mold, while in other instances the bead rings are formed integral with the mold so as to effect the "rimming up" of the casing in the act of closing the mold. In either case, the bead rings form part of the mold during vulcanization, and it is quite important that the beads or bead portions (which, as will be understood, are more or less shapeless in the green or unvulcanized condition of the tire casing) be pressed firmly into their seats in the mold in order that they may be molded to proper shape during vulcanization.

Heretofore, the shaping of the bead portions has had to be performed mainly in the green or unvulcanized condition of the tire casing, since, on account of the sealing ring being solid or relatively rigid and occupying the whole of the bead zones, the pressure fluid when admitted into the sealed casing is incapable of exerting much, if any, influence on the shaping of the beads. In other words, when the tire casing is "rimmed up", the bead rings or the mold sections formed with the bead seats are drawn together to press the beads firmly against the solid sealing ring, and it is this pressure which is largely relied upon to force the bead portions into the mold seats to shape them, the subsequent vulcanization merely acting to give permanent form to the bead portions as thus shaped in the green or raw state. The success of this old practice has depended to a great extent upon the accuracy in making up the bead portions in the raw casing, care being taken that the proper volume of stock is allowed in building the casing, and that the stock is properly finished so as to avoid buckles or wrinkles or other irregularities.

Notwithstanding the extreme care which may thus be observed, it frequently happens that the finished beads are faulty, sometimes being too large or bulky, at other times too small or made with insufficient stock, and quite often wrinkled or buckled or otherwise irregularly formed or contoured. These faults are bound to be reflected in the vulcanized tire casing because the pressure fluid is totally incapable of remedying them. Thus, if the bead portions are too large, the stock, after filling up the bead seats, is caused to flow up along the inside of the tire casing beyond the sealing ring, being squeezed or forced in that direction by the pressure applied by the solid sealing ring in the rimming-up operation. On the other hand, if the bead portions are too small, the pressure of the sealing ring is insufficient to hold them in place during the expansion of the tire casing under the internal fluid pressure, and as a result the inner plies of the carcass are pulled up and away from the beads proper, producing a rounded toe effect in contrast to the sharp pointed toe which it is the aim to produce. In the case of wrinkles or buckles, the pressure of the sealing ring is of course non-uniform throughout the circumference of the beads, as it should be, and hence the cords of the carcass are stretched more in some places than in others, thus producing a non-uniform tension in the different cords of the tire casing in addition to causing mis-shaped beads. Perhaps of greater importance, if the sealing ring for any reason fails to fit smoothly and with uniform pressure against the bead portions, the pressure fluid will leak past the sealing ring and not only prevent the proper shaping of the bead portions but in addition (especially in the case of water) find its way into the fabric structure of the tire casing and damage it in one way or another,—in most instances producing an imperfect tire.

These and other defects (discovered after long study and experimentation) are obviated by the present invention, which is directed to a novel form of vulcanizing mold and a novel form of sealing ring whereby a tire casing may be sealed at the beads without danger of leakage of the pressure fluid, and whereby the bead portions of the casing may be molded to proper shape,—all regardless of the above-mentioned imperfections present in the bead portions of the casing in its green or unvulcanized condition. To this end, the sealing ring (preferably of rubber, as usual), while made sufficiently rigid to act as an abutment against which the bead portions of the tire casing may be locked or clamped preparatory to vulcanization, is so formed as to be capable of free lateral expansion in the bead zones by the fluid pressure admitted into the sealed casing before vulcanization. In the particular embodiment herein shown, the sealing ring is composed of a relatively rigid base member and two side members united thereto along lines located radially inward of the outer circumference of the base member, so as to leave at opposite sides of the base member in the bead zones narrow channels or passages adapted to communicate with the interior of the sealed casing. Other forms of sealing ring which will also answer the purpose are disclosed in my copending application Serial No. 602,957, filed April 4, 1932, to which reference may be had, if desired.

Moreover, the mold is vented in the bead zones so as to carry off any pressure fluid escaping at the beads from the sealed casing, this being accomplished by drilling small holes or openings in the bead seats of the mold, some arranged to lead from the inner edges or toes of the beads, and others (although not entirely necessary) arranged to lead from the outer edges or heels of the beads.

According to this new construction of the parts, the high pressure maintained within the sealed tire casing during vulcanization will be caused to force the side walls of the sealing ring outwardly and press the bead portions into the mold seats, any fluid which has leaked past the sealing ring or trapped between it and the tire casing being allowed to escape through the vents of the bead seats or forced outwardly through those vents by the internal pressure itself. Under such conditions, no pressure will be allowed to build up between the sealing ring and the tire casing such as would neutralize the internal pressure and prevent the lateral expansion of the sealing ring against the bead portions of the casing. Consequently, the side walls of the sealing ring will always act in response to the internal pressure, first to seal the tire casing at the beads, and thereafter to press and hold the bead portions of the casing to their seats in the mold. Being flexible, the side walls of the sealing ring will conform themselves to any irregularities in the bead portions, yielding sufficiently to absorb any surplus stock if the bead portions are too large, or expanding sufficiently to compensate for any deficiency in stock if the bead portions are too small and thus exerting a uniform pressure against the bead portions throughout their entire circumference. While thus made intentionally flexible and expansible, the side walls of the sealing ring at the beads will be amply supported against collapse during the rimming up process, this support being desirable to insure the preliminary seating of the bead portions in the mold seats as well as their preliminary shaping.

In the accompanying drawing:

Fig. 1 is a cross section of the improved vulcanizing mold showing a tire casing with the improved form of sealing ring therein before the casing is expanded in the mold by the admission of fluid pressure;

Fig. 2 is a similar view showing the tire casing fully expanded in the mold by the fluid pressure admitted into the sealed casing or the condition of the parts during and after vulcanization; and Fig. 3 is a perspective view of a section of the bead rings detached, showing in particular the vent holes or perforations formed in the rings.

The vulcanizing mold herein shown is of standard construction, comprising top and bottom sections 1 and 2 formed with a suitable cavity which determines the final size and shape of the vulcanized tire casing. For non-skid casings, the mold sections will be formed with pockets or depressions to give the particular tread design desired, but these depressions have been omitted from the drawing for the sake of clearance. In Figs. 1 and 2, it will be observed that the tire casing A is shown as mounted upon a pair of bead rings 3, which when placed in the mold form a part thereof and which are formed with seats for the beads or bead portions $A^1$ of the casing, these seats being constituted by the plain cylindrical outer faces 4 of the rings and the curved inner faces 5 of the side flanges with which the rings are provided. Bolts or other suitable locking devices are employed to hold the two bead rings in contacting relation as shown.

According to this invention, the bead rings 3 are each formed with two circumferential series or rows of vent holes or perforations $3^a$ and $3^b$, the former being arranged to lead from the inner edges or toes of the beads $A^1$, and the latter arranged to lead from the outer edges or heels of the beads. The same arrangement would apply if the bead rings, as they could be, were formed integral with the mold sections 1 and 2. The mold shown is of the type used in pot heaters, and hence the vents $3^a$ and $3^b$ will open directly into the pot heater, although of course they could be led into some other low pressure chamber, whether formed in the mold itself or outside of the mold. It hardly needs to be stated that the pressure within the pot heater (approximately fifty pounds per square inch) is much lower than the pressure maintained within the sealed tire casing, this pressure running in some cases as high as two hundred fifty pounds per square inch.

Located within the tire casing is the improved form of sealing ring B, which preferably is made of rubber and comprises a solid or relatively rigid base member $B^1$ and two flexible side members $B^2$, the base member being shaped at its inner periphery to fit within the V-shaped channel 6 formed by the bead rings. As will be observed, the side members $B^2$ are made to join the solid base member $B^1$ along lines $B^3$ located radially inward of the outer circumference of the base member, leaving at opposite sides thereof narrow annular channels or passages $B^4$ communicating with the interior of the sealed casing. It is pointed out that the depth of these channels or passages $B^4$ is such as approximately to reach the toes of the bead portions $A^1$ of the tire casing, thus allowing the flexible side members $B^2$ to extend radially inward far enough to occupy substantially the whole bead zones of the tire casing.

As thus constituted, the sealing ring will function in the manner previously described. Thus, when the tire casing with the sealing ring in place is mounted on the bead rings 3, the beads $A^1$ of the casing will be drawn inwardly against the solid base member $B^1$, which, being relatively rigid, will press the bead portions into the mold seats formed by the faces 4 and 5 of the bead rings. In this rimming-up operation, the side members $B^2$, being flexible, will yield until they are pressed up against the solid base member $B^1$, as shown by way of illustration in Fig. 1. Later, however, when pressure fluid is admitted into the sealed casing, the fluid will enter the channels or passages $B^4$ and force the side members $B^2$ outwardly again to whatever extent the bead portions A¹ of the tire casing will permit, as indicated in Fig. 2.

In other words, the pressure fluid admitted into the sealed casing is allowed to act directly against the bead portions to cause them to fill up the mold seats and to hold them therein during vulcanization. If the bead portions should be too large or bulky, the side members B² will, because of their flexibility, yield to the required extent during the locking up process and then during vulcanization apply a uniform pressure throughout the bead portions to shape them properly and without piling up the material above the sealing ring. If the bead portions should be too small, the side members B² will expand or spread laterally away from the base member B¹ under the action of the pressure fluid and act similarly to shape and mold the beads during vulcanization. In this same expanding action, the side members are forced into intimate contact with the bead portions, regardless of their size and shape, and hence will act as lip gaskets in sealing the fluid against escape, the side walls, because of their flexible and elastic character, readily conforming themselves to any wrinkles or irregularities in the bead portions. Such action of the sealing ring is permitted and assured by the presence of the vent holes 3ª and 3ᵇ in the bead rings 3, since any fluid leaking past the ring will escape through vent holes or be forced out by the lateral pressure of the side members B² against the bead portions. In short, the fluid pressure, being allowed to act directly in the bead zones, will exert the same pressure at the beads as at any other portion of the tire casing, with the result that all parts of the casing will be vulcanized under a uniform pressure.

The sealing ring is provided, as usual, with a valve stem B⁵ through which the pressure fluid is admitted for vulcanization. As before stated, this pressure fluid may be water, steam, air, or some other fluid. If water is employed, it is recommended that the valve stem be equipped with a flexible hose section B⁶ which may rest at its free end upon the bottom side of the tire cavity at its lowest point. Since this feature forms no part of the present invention, no further description will be given, although, if desired, reference may be had to my copending application Serial No. 166,056, filed February 5, 1927, for a full disclosure of a method and apparatus which can be employed in the carrying out of the vulcanization of tire casings under the action of water. In this same application, there is also disclosed a sealing ring equipped with two valve stems with similar hose sections, such as may be used in circulating water continuously through the sealed casing during vulcanization.

While the improved form of sealing ring has been described herein as composed wholly of rubber, it could be otherwise constituted so long as it is capable of performing its intended functions. Thus, the base member B¹, instead of being of rubber, could be made of metal so as to be completely rigid and the side members alone made of rubber; or in a broader sense, both the base member and the side members could be made of metal, provided the side members possessed the necessary degree of flexibility and the ring as a whole possessed the necessary degree of lateral expansibility. Moreover, if desired, the sealing ring could be formed with holes or perforations leading from the narrow channels or passages to the interior of the sealed casing to insure the entrance of the pressure fluid into such channels. The invention also comprehends a pressure sealing ring which derives its presure independently of the pressure fluid admitted into the sealed tire casing. For example, a hollow pressure ring could be employed having its own inflating valve stem. These and other changes and modifications will readily suggest themselves to those skilled in the art without departing from the spirit and scope of the invention.

Having thus described my invention, what I claim is:

1. A tire casing vulcanizing mold having bead seats formed with pressure relief vents, said vents being open and effective in the closed vulcanizing condition of the mold independently of the fit of the mold parts.

2. A tire casing vulcanizing mold having bead seats, said seats being formed with pressure relief vents arranged to lead directly from the inner edges or toes of the tire casing beads.

3. A tire casing vulcanizing mold having bead seats, said seats being formed with pressure relief vents arranged to lead directly from the inner edges or toes of the tire casing beads and with other pressure relief vents arranged to lead directly from the outer edges or heels of the tire casing beads.

4. A mold for vulcanizing under direct internal fluid pressure a tire casing sealed at the base, said mold being formed in the bead zones with pressure relief vents, said vents being open and effective in the closed vulcanizing condition of the mold independently of the fit of the mold parts to carry off any pressure fluid escaping at the beads from the sealed casing.

5. A mold for vulcanizing under direct internal fluid pressure a tire casing sealed at the base, said mold having bead seats formed with pressure relief vents, said vents being open and effective in the closed vulcanizing condition of the mold independently of the fit of the mold parts, whereby any pressure fluid escaping at the beads from the sealed casing will be carried off.

6. A bead ring on which a tire casing is mounted, said ring being formed with pressure relief vents leading from the bead seat.

7. A bead ring on which a tire casing is mounted preparatory to vulcanization, said ring being formed with pressure relief vents arranged to lead from the toe of the tire casing bead.

8. A bead ring on which a tire casing is mounted preparatory to vulcanization, said ring being formed with pressure relief vents arranged to lead from both the toe and heel of the tire casing bead.

9. In combination, a sectional mold having a tire casing cavity, an annular ring for sealing the casing at the beads, means for admitting fluid under pressure into the sealed casing, and means for venting the mold in the bead zones to carry off any pressure fluid escaping from the sealed casing at the beads.

10. A sectional tire casing vulcanizing mold having vented bead seats, in combination with an annular ring for sealing a tire casing at the beads during vulcanization and having means for admitting fluid under pressure into the sealed casing, said ring being formed to permit of free lateral expansion by fluid pressure in the bead zones.

11. A sectional tire casing vulcanizing mold having vented bead seats, in combination with an annular ring for sealing a tire casing at the beads during vulcanization and having means for admitting fluid under pressure into the sealed casing, said ring being formed to permit of free lateral expansion in the bead zones by the fluid pressure admitted into the sealed casing.

12. A sectional tire casing vulcanizing mold having vented bead seats, in combination with an annular ring for sealing a tire casing at the beads during vulcanization and having means for admitting fluid under pressure into the sealed casing, said ring being formed with flexible side walls adapted to conform to the configuration of the bead portions when locked in place therebetween preparatory to the admission of fluid pressure into the sealed casing and adapted to be forced outwardly by the fluid pressure admitted into the sealed casing.

13. A sectional tire casing vulcanizing mold having vented bead seats, in combination with an annular ring for sealing a tire casing at the beads during vulcanization and having means for admitting fluid under pressure into the sealed casing, said ring being sufficiently rigid to act as an abutment against which the bead portions of the casing may be locked preparatory to the admission of fluid pressure into the sealed casing and formed to permit of free lateral expansion in the bead zones by the fluid pressure admitted into the sealed casing.

14. A sectional tire casing vulcanizing mold having vented bead seats, in combination with an annular ring for sealing a tire casing at the beads during vulcanization and having means for admitting fluid under pressure into the sealed casing, said ring being formed to permit of a limited lateral compression when locked in place between the beads preparatory to the admission of fluid pressure into the sealed casing and of free lateral expansion in the bead zones by the fluid pressure admitted into the sealed casing.

15. A sectional tire casing vulcanizing mold having vented bead seats, in combination with an annular ring for sealing a tire casing at the beads during vulcanization and having means for admitting fluid under pressure into the sealed casing, said ring being formed with a circumferential slit extending radially inward into the bead zones and adapted to communicate with the interior of the sealed casing.

16. A sectional tire casing vulcanizing mold having vented bead seats, in combination with an annular ring for sealing a tire casing at the beads during vulcanization and having means for admitting fluid under pressure into the sealed casing, said ring comprising a relatively rigid base member, and two flexible side members separated from the base member in the bead zones by narrow annular channels or passages communicating with the interior of the sealed casing.

17. A sectional tire casing vulcanizing mold having vented bead seats, in combination with an annular ring for sealing a tire casing at the beads and having means for admitting fluid under pressure into the sealed casing, said ring being flexible enough to conform to the bead portions of the casing in locking the ring in place therein and yet sufficiently rigid to press the bead portions into the mold seats during said locking operation, and said ring being formed to permit of free lateral expansion in the bead zones of the casing after the fluid pressure is admitted into the sealed casing, so that the pressure will be effective in sealing the casing cavity at the beads and in shaping and molding the bead portions in the mold seats.

18. The method of vulcanizing a tire casing, which consists in sealing the casing at the beads by an annular sealing ring capable of free lateral expansion when in place in the casing, placing the sealed casing in a confining mold formed with bead seats, admitting fluid under pressure into the sealed casing and causing said pressure to effect the lateral expansion of the sealing ring, and venting the mold in the bead zones to permit the escape of any fluid leaking past the sealing ring.

19. The method of vulcanizing a tire casing, which consists in placing a sealing ring within the tire casing to be vulcanized, pressing the beads of the casing against the sealing ring, the latter being sufficiently flexible to conform to the bead portions and yet sufficiently rigid to act as an abutment for the locking of the ring in place in the casing, placing the sealed casing in a suitable mold formed with bead seats, admitting fluid under pressure into the sealed casing, and causing said pressure to effect a lateral expansion of the sealing ring to force the bead portions into their mold seats, and venting the mold at the bead seats to permit the escape of any fluid leaking past the sealing ring.

LAURITS A. LAURSEN.